United States Patent [19]
Metzger

[11] Patent Number: 5,206,494
[45] Date of Patent: Apr. 27, 1993

[54] IDENTIFICATION CARD

[76] Inventor: Romain Metzger, 15559 Brookridge Blvd., Brooksville, Fla. 34613

[21] Appl. No.: 803,506

[22] Filed: Dec. 9, 1991

[51] Int. Cl.⁵ ............................................. G06K 19/00
[52] U.S. Cl. .................... 235/487; 235/488; 235/490
[58] Field of Search .................. 235/487, 488, 490

[56] References Cited
U.S. PATENT DOCUMENTS
3,564,214  2/1971  Cooper ........................ 235/487

Primary Examiner—Harold Pitts
Attorney, Agent, or Firm—Richard W. Carpenter

[57] ABSTRACT

An identification card having one part that is movable relative to the other part of the card. A primary code portion 15 located on one part of the card, and a secondary code portion 15 located on the other part of the card. The card holder can move one part of the card relative to the other part to make codes function in combination with each other to identify the holder.

14 Claims, 2 Drawing Sheets

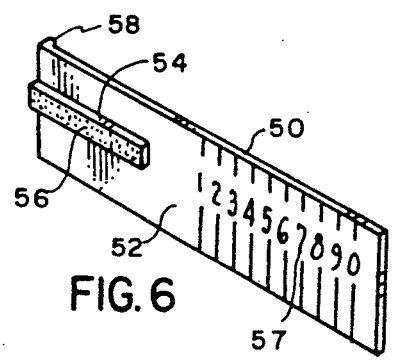
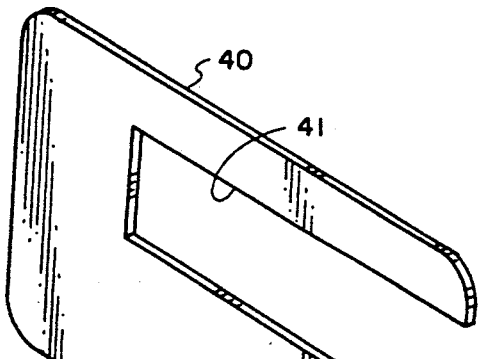
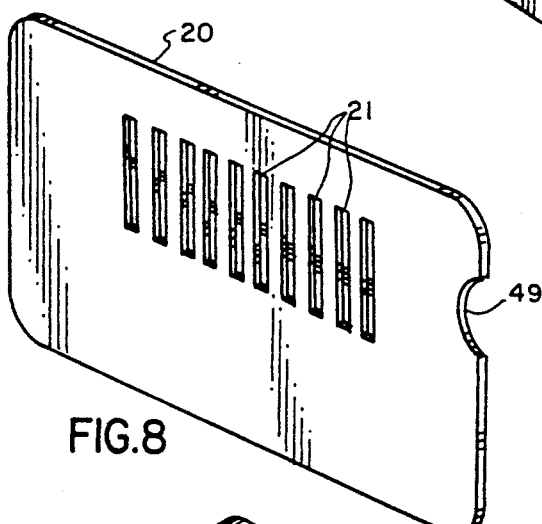
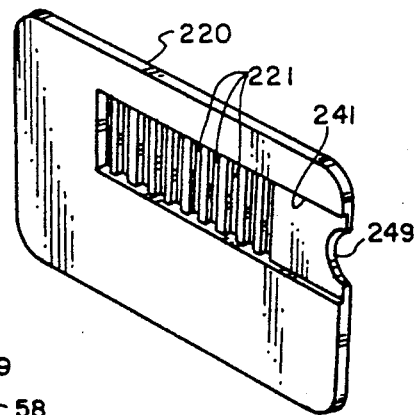
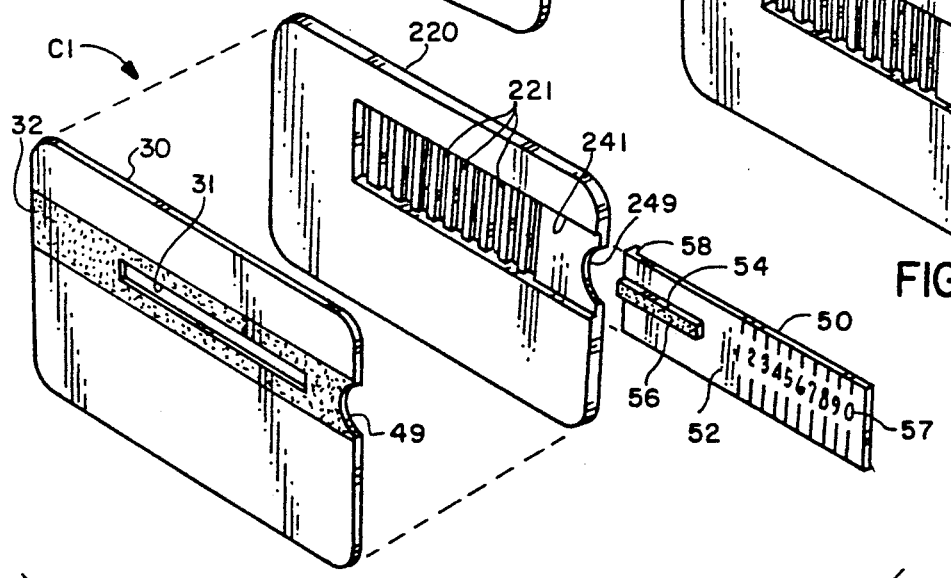

IDENTIFICATION CARD

BACKGROUND OF THE INVENTION

1. Field of the Invention

This invention relates to identification cards of the type used as credit cards, bank ATM cards, or for other applications requiring user identification, and more particularly to a card having a special code arrangement which requires an adjustment of the card by one familiar with the code before the card will identify the authorized card holder.

2. Description of Background Art

A background art search directed to the subject matter of this application conducted in the U.S. Pat. and Trademark Office disclosed the following U.S. Letters Patent: U.S. Pat. Nos. 3,399,473; 3,705,294; 4,801,790; and 4,899,038.

None of the patents uncovered in the search discloses an identification card having a primary magnetic code portion located on a non-movable part of the card and a secondary magnetic code portion located on a movable part of the card which card requires action by one familiar with the code arrangement to move one part of the card relative to the other to make the two separate code portions function in combination with each other to identify the authorized holder of the card.

SUMMARY OF THE INVENTION

It is a primary object of the present invention to provide an identification card containing a code including separate code portions, so that only a person familiar with the code arrangement is able to use the card for identification purposes.

A more specific object of the invention is the provision of an identification card having movable and non-movable parts, each containing separate portions of a magnetic code, whereby only when the parts of the card placed in a certain predetermined position relative to each other will the two code portions function together to identify the owner of the card.

These and other objects of the invention will be apparent from the examination of the following description and drawings.

BRIEF DESCRIPTION OF THE DRAWINGS

FIG. 6 is an isometric view of the movable slide member illustrated if the previous views;

FIGS. 7 and 8 are isometric views of the inner layer and the lower outer layer, respectively, illustrated in the previous views;

FIG. 9 is a view similar to that of FIG. 5, but illustrating a slightly modified form of the invention; and FIG. 10 is an isometric view of the combined inner layer and lower outer layer illustrated in FIG. 9.

It will be understood that, for purposes of clarity, certain elements may have been intentionally omitted from certain views where they are believed to be illustrated to better advantage in other views.

DESCRIPTION OF THE PREFERRED EMBODIMENT

Figure 1:
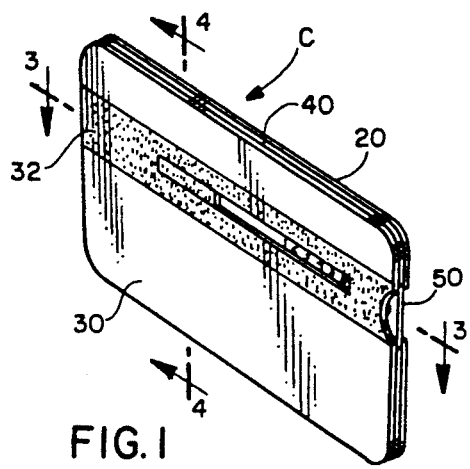
FIG. 1 is a fragmentary isometric view of an identification card embodying features of the invention, with the movable slide member shown in an inoperative position.
Figure 2:
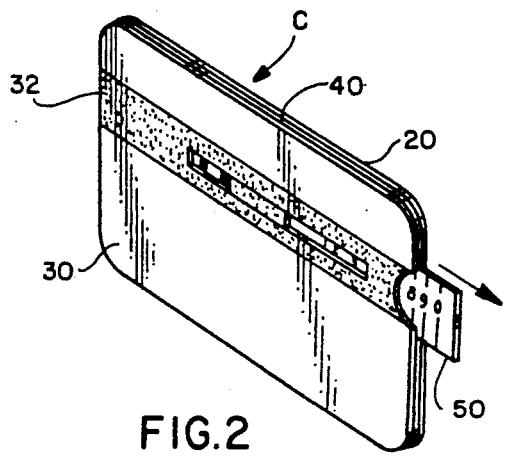
FIG. 2 is a view similar to that of FIG. 1, but with the movable slide member shown in an operative position.
Figure 3:
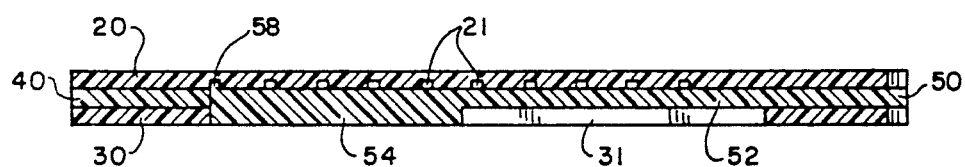
FIGS. 3 and 4 are enlarged sectional views taken on lines 3—3 and 4—4, respectively, of FIG. 1.
Figure 4:
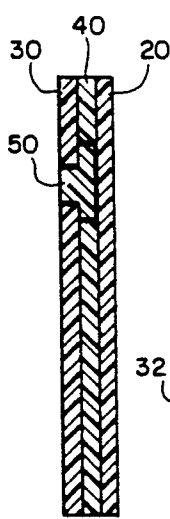
Figure 5:
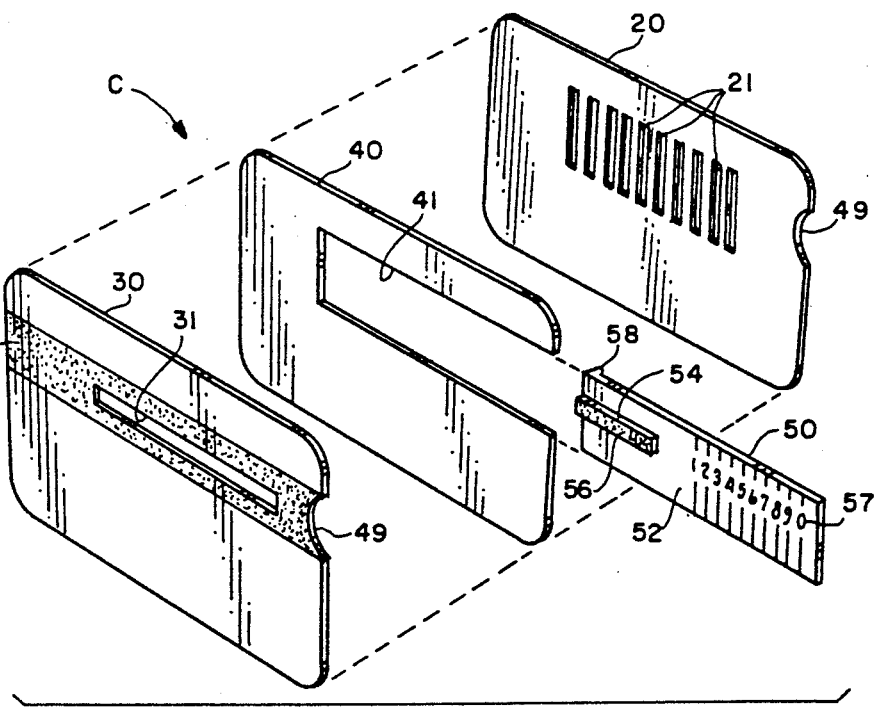
FIG. 5 is an exploded view of the structure illustrated in FIG. 1.

Referring now to the drawings for a better understanding of the invention, it will be seen that an indentification card embodying features of the invention and indicated generally at 10 in FIGS. 1 and 5 comprises a base or non-movable member 10 and a slide or movable member 50.

Base member 10 is a multi-ply article that includes a pair of lower and upper outer layers 20 and 30, respectively, between which is sandwiched an inner layer 40.

Slide member 50 is positioned within inner layer 40 and mounted for sliding movement longitudinally of the card between the lower and upper outer layers.

All three layers of the base member are relatively thin, flat, plate-like elements. Outer layers 20 and 30 are generally rectangular, and inner layer 40 is generally U-shaped.

As best seen in FIG. 8, lower outer layer 20 has on its inner or upper surface, a plurality of indentations or recesses 21 adapted to receive a detent 58 of slide member 50 as described later in the specification.

Upper outer layer 30, as seen in FIG. 5, has a relatively narrow, longitudinally disposed, opening 31 extending therethrough, the ends of which lie inwardly adjacent the opposite ends of the upper outer layer. The purpose of opening 31 is to receive a raised portion of the slide or movable member 50 as described later in the specification.

Also, it will be seen that the upper outer layer 30 has on its upper surface a magnetic strip, indicated at 32 and located immediately adjacent opening 31, which bears one portion of an identification code.

As best seen in FIG. 7 of the drawings, inner layer 40 is generally U-shaped, having extending inwardly from one end thereof a relatively narrow, elongated, opening 41 which is approximately the same width as upper outer layer opening 31.

The purpose of opening 41 is to provide, between the upper and lower outer layers of the card, a groove adapted to receive the movable slide member 50 in a manner hereinafter described.

Slide member 50, as seen in FIG. 6, comprises a relatively narrow, elongated, body 52 with a raised portion 54 projecting upwardly from one end thereof through upper outer layer opening 31, so its upper surface is co-planar with the upper surface of upper outer layer 30 when the card components are assembled.

Raised portion 54 has thereon a magnetic strip 56 bearing another portion of an identification code that is designed and adapted to cooperate with the portion of the magnetic code on the upper outer layer surface in a manner hereinafter described.

The opposite end of body 52 has numbers, letters, or other indicia 57 that serve to mark various positions of the slide member relative to the base member of the card to facilitate the positioning of the slide member required for identification.

Also, it will be seen that the under side of body 52 has projecting downwardly therefrom a plurality of detents 58 which may be in the form of circular areas or elongated areas. The detents are so contoured as to be receivable within the recesses 21 of the lower outer member previously described. This arrangement insures accurate positioning of the slide member.

In order to facilitate grasping of the slide member, all three layers of the card base member may be provided with minor recesses or cutout portions 49 at one side of the card.

In order to form the card, the slide member is placed within opening 41 of the inner layer, which layer is then interposed and secured between the upper and lower outer layers, with the raised portion 54 of the slide member projecting upwardly through opening 31 of the upper outer layer of the card. At this point the upper surface of the raised portion 54 is co-planar with the upper surface of the card upper outer layer.

After the card has been formed, but before a code is applied to the magnetic strips of the card, the slide member 50 is pulled out and positioned in a particular predetermined position relative to the base member 10.

When this has been done, the card can be passed through the equipment necessary to apply an identification code to the magnetic strips of the card, with one portion of the code applied to the magnetic strip on the card upper outer layer and the other portion of the code applied to the magnetic strip on the slide member raised part. Then the slide member can be pushed all the way into the card base member and left in such position until ready for use by the card holder.

When the cardholder seeks to use the card, if the slide member is pulled out to the predetermined position, the card reading equipment will be able to read the entire code and thereby properly identify the card owner.

A slightly modified form of the invention is illustrated in FIGS. 9 and 10. The only difference between this embodiment of the invention and the previously described embodiment, is that the inner layer has been combined with the lower outer layer to form a composite lower outer layer 220.

All of the other components of the structure that correspond to components referred to and described in connection with the first embodiment have been identified with related numerals.

In card C1 of the second embodiment, lower outer 220 is provided with an upwardly facing opening 241 adapted to receive slide member 50 in the same manner as in the first embodiment.

Also, lower outer layer 220 is provided with a plurality of recesses 221 adapted to receive detent 58 of the slide member.

The operation and function of this embodiment of the invention are exactly in the same fashion as those of the previously described embodiment.

Thus, it will be appreciated that the invention provides a simple means, using existing and available equipment to provide an identification card with a special type of identification code, whereby the card can only be used successfully by a person familiar with the code arrangement.

What is claimed is:

1. An identification card having a primary code portion, located on a non-movable member of the card, and a secondary code portion, located on a movable member of the card, which card requires action by a card holder to make said code portions function in combination with each other in order to identify the owner of the card, comprising:
   (a) a non-movable base member including:
      (i) a pair of thin, flat, generally rectangular, first and second outer layers;
      (ii) a thin, flat, generally U-shaped inner layer secured between said outer layers and having an elongated first opening therein that forms between said outer layers a groove extending to one end thereof for receiving a movable slide member;
   (b) said first outer layer having an elongated second opening therein located intermediate opposite ends thereof, aligned with portions of said first opening, and having on an outer first surface thereof, adjacent said second opening, a primary portion of a magnetic identification code;
   (c) a movable slide member positioned within said groove for slidable movement between said outer layers;
   (d) said movable slide member having on one side thereof a raised portion with a second surface co-planer with said first surface and having thereon a secondary portion of a magnetic identification code which, when said second surface is placed in a predetermined position relative to said first surface, will enable said secondary code portion, in combination with said primary code portion, to identify the owner of the card;
   (e) means for accurately positioning said movable slide member in said predetermined position.

2. An identification card having a primary code portion, located on a non-movable member of the card, and a secondary code portion, located on a movable member of the card, which card requires action by a card holder to make said code portions function in combination with each other in order to identify the owner of the card, comprising:
   (a) a non-movable base member including:
      (i) a pair of thin, flat, generally rectangular, first and second outer layers;
      (ii) a thin, flat, inner layer secured between said outer layers and having an elongated first opening therein that forms between said outer layers a groove extending to one end thereof for receiving a movable slide member;
   (b) said first outer layer having an elongated second opening therein located intermediate opposite ends thereof, aligned with portions of said first opening, and having on an outer first surface thereof, adjacent said second opening, a primary portion of an electrically readable identification code;
   (c) a movable slide member positioned within said groove for slidable movement between said outer layers;
   (d) said movable slide member having on one side thereof a raised portion with a second surface co-planer with said first surface and having thereon a secondary portion of an electrically readable identification code which, when said second surface is placed in a predetermined position relative to said first surface, will enable said secondary code portion, in combination with said primary code portion, to identify the owner of the card;
   (f) means for accurately positioning said movable slide member in said predetermined position.

3. An identification card having a primary code portion, located on a non-movable member of the card, and a secondary code portion, located on a movable member of the card, which card requires action by a card holder to make said code portions function in combination with each other in order to identify the owner of the card, comprising:

(a) a non-movable base member including a pair of thin, flat, generally rectangular, first and second outer layer;

(b) said first outer layer having an elongated second opening therein located intermediate opposite ends thereof, aligned with portions of said first opening, and having on an outer first surface thereof, adjacent said second opening, a primary portion of an electrically readable identification code;

(c) a movable slide member positioned within a groove for slidable movement between said outer layers;

(d) said movable slide member having on one side thereof a raised portion with a second surface coplaner with said first surface and having thereon a secondary portion of an electrically readable identification code which, when said second surface is placed in a predetermined position relative to said first surface, will enable said secondary code portion, in combination with said primary code portion, to identify the owner of the card;

(f) means for accurately positioning said movable slide member in said predetermined position.

4. An identification card according to claim 2, wherein said inner layer is generally U-shaped.

5. An identification card according to claim 2, wherein said electrically readable code is magnetic.

6. An identification card according to claim 3, wherein said electrically readable code is magnetic.

7. An identification card according to claim 3, and including an inner layer interposed between said outer layers and having an opening forming a groove for slidably receiving said movable slide member.

8. An identification card according to claim 3, wherein said second outer layer has an opening therein forming a groove for slidably receiving said movable slide member.

9. An identification card according to claim 1, wherein said movable slide member positioning means includes a detent on one of said members arranged and disposed for selective positioning in one of a plurality of recesses in the other of said members.

10. An identification card according to claim 2, wherein said movable slide member positioning means includes a detent on one of said members arranged and disposed for selective positioning in one of a plurality of recesses in the other of said members.

11. An identification card according to claim 3, wherein said movable slide member positioning means includes a detent on one of said members arranged and disposed for selective positioning in one of a plurality of recesses in the other of said members.

12. An identification card according to claim 1, wherein said recesses are in an upper surface of said lower outer layer.

13. An identification card according to claim 2, wherein said recesses are in an upper surface of said lower outer layer.

14. An identification card according to claim 3, wherein said recesses are in an upper surface of said lower outer layer.

* * * * *